United States Patent [19]

AuClair

[11] Patent Number: 5,659,670
[45] Date of Patent: Aug. 19, 1997

[54] SELF CONFIGURING NETWORK/PRINTER SYSTEM

[75] Inventor: Christopher J. AuClair, Fairport, N.Y.

[73] Assignee: Xerox Corporation, Stamford

[21] Appl. No.: 362,350

[22] Filed: Dec. 22, 1994

[51] Int. Cl.⁶ ............................................... G06K 15/00
[52] U.S. Cl. ............................... 395/115; 395/114
[58] Field of Search ........................ 395/112, 114, 395/115, 116, 163, 164, 165, 166, 518, 512, 507, 828–830, 876, 894; 358/404, 402, 444; 400/61, 62, 70, 71, 76

[56] References Cited

U.S. PATENT DOCUMENTS

| | | | |
|---|---|---|---|
| 4,942,541 | 7/1990 | Hoel et al. | 364/519 |
| 5,075,874 | 12/1991 | Steeves | 395/112 |
| 5,108,207 | 4/1992 | Isobe et al. | 395/115 |
| 5,159,681 | 10/1992 | Beck et al. | 395/425 |
| 5,212,566 | 5/1993 | U et al. | 358/444 |
| 5,371,837 | 12/1994 | Kimber et al. | 395/112 |
| 5,371,873 | 12/1994 | Niwa | 395/114 |

*Primary Examiner*—Arthur G. Evans
*Attorney, Agent, or Firm*—Don L. Webber

[57] ABSTRACT

An apparatus and method for managing a set of printer memory requirements, including a random access memory for storing data in a set of variably sized compartments and a processor for determining a source of a predetermined number of print input jobs. A controller, responsive to the size determinations by the processor, generates a set of optimized memory compartment reallocation recommendations according to the source of the predetermined number of print input jobs.

30 Claims, 5 Drawing Sheets

FIG. 3

Analysis of job mix over last 100 jobs:

| | |
|---|---|
| Serial port jobs: | 0 |
| Average size: | 0 |
| Parallel port jobs: | 13 |
| Average size: | 897560 |
| Network Card jobs: | 87 |
| Average size: | 1980850 |
| Simultaneous accesses | 4 |
| Average job size (pages) | 2 |
| Number of virtual memory failures | 5 |
| Number of reused fonts in cache | 6 |

Recommened Changes:
Reduced Serial Port buffer to 0
Do not change Parallel buffer
Increase the Network Card buffer to 2100000

Make recommended changes? ( YES ) ( NO )

Of the last 100 jobs, only 4 accessed the printer simultaneously. Do you wish to eliminate duplicate buffers? ( YES ) ( NO )

The number of virtual memory failures was high, do you want to reassign recovered memory to the PostScript Heap ( to reduce print failures) or to the display list ( for more continous printing)?? ( POSTSCRIPT HEAP ) ( DISPLAY LIST )

150

SELF CONFIGURING NETWORK/PRINTER SYSTEM

TECHNICAL FIELD

The present invention relates to a self configuring network and/or printer system, and more particularly, to a printer that analyzes network user and printer memory utilization, and thereafter recommends changes regarding or automatically reconfigures the memory allocation to optimize a particular set of utilization parameters.

BACKGROUND OF THE INVENTION

In the process of digital electrostatographic printing, an electrostatic charge pattern or latent image corresponding to an original or electronic document may be produced by a raster output scanner on an insulating medium. A viewable record is then produced by developing the latent image with particles of granulated material to form a powder image thereof. Thereafter, the visible powder image is fused to the insulating medium, or transferred to a suitable support material and fused thereto. Development of the latent image is achieved by bringing a developer mix into contact therewith. Typical developer mixes generally comprise dyed or colored thermoplastic particles of granulated material known in the art as toner particles, which are mixed with carrier granules, such as ferromagnetic granules. When appropriate, toner particles are mixed with carrier granules and the toner particles are charged triboelectrically to the correct polarity. As the developer mix is brought into contact with the electrostatic latent image, the toner particles adhere thereto. However, as toner particles are depleted from the developer mix, additional toner particles must be supplied.

In the operation of an electrophotographic copier or printer, particularly color machines, it is highly desirable to optimize printer memory utilization, by allocating the memory capability of the printer according to historical network user information. Such a system would allocate available memory to avoid the increased expense and hardware requirement of adding memory required to meet user needs, in those situations in which adequate memory is present, yet is less that optimally distributed. At the same time, realizing that even vast memory resources may at times prove insufficient, such as during peak network user activity and/or during particularly large or complex print jobs, the finite printer/network memory resource that is available can be distributed so as to result in the fewest possible unsuccessful or excessively delayed print operations.

Various systems and corrective actions have been taken to prevent the occurrence of these and other undesirable image attributes, to include the following disclosures may be relevant to various aspects of the printer or network memory utilization evaluation/reallocation system of the present invention:

U.S. Pat. No. 5,212,566

Patentee: U et al.

Issued: May 18, 1993

U.S. Pat. No. 5,159,681

Patentee: Beck et al.

Issued: Oct.27, 1990

U.S. Pat. No. 4,942,541

Patentee: Hoel et al.

Issued: Jul.17, 1990

U.S. Pat. No. 5,121,566 discloses a copier/printer system which uses memory allocation logic for storing scanned images. Memory allocation and reallocation are used to scan and/or rescan jobs when system memory is depleted, particularly during the course of highly complex scan jobs.

U.S. Pat. No. 5,159,681 discloses a page printing memory allocation system for a page printer controller. The system manages RAM to alter bit map memory size, page buffer memory and user memory.

U.S. Pat. No. 4,942,541 discloses a page printing system which uses virtual (logical) memory for mapping images. Physical memory which is used for creating a page image bitmap for synthetic graphics is to be allocated as patches. A path in general corresponds to a rectangular area of a page when the page exists in bitmap form. Each patch is represented by a set of non-contiguous segments of logical memory which, when mapped to physical memory, are contiguous allocation of memory in such printers among various memory uses.

SUMMARY OF THE INVENTION

In accordance with one aspect of the present invention, there is provided an apparatus for managing a set of printer memory requirements. The apparatus includes a random access memory for storing data in a set of variably sized compartments; a processor for determining a source of a predetermined number of print input jobs; and a controller, responsive to the processor, for generating a set of optimized memory compartment size allocation recommendations according to the source of the predetermined number of print input jobs.

In accordance with another aspect of the present invention, there is provided a printing machine of the type in which a set of printer memory requirements is managed. The apparatus includes a random access memory for storing data in a set of variably sized compartments; a processor for determining a source of a predetermined number of print input jobs; and a controller, responsive to the processor, for generating a set of optimized memory compartment size allocation recommendations according to the source of the predetermined number of print input jobs.

In accordance with another aspect of the present invention, there is provided a method of managing a set of printer memory requirements, including: storing data in a random access memory having a set of variably sized compartments; determining a source of a predetermined number of print input jobs; and generating a set of optimized memory compartment size allocation recommendations according to the source determinations of the predetermined number of print input jobs.

Other features of the present invention will become apparent as the following description proceeds and upon reference to the drawings, in which:

BRIEF DESCRIPTION OF THE DRAWING

FIG. 3 is a exemplary display screen showing the printer utilization evaluation/reallocation determinations and selection options in accordance with the present invention;

DESCRIPTION OF THE PREFERRED EMBODIMENT

While the present invention will hereinafter be described in connection with preferred embodiments thereof, it will be understood that it is not intended to limit the invention to these embodiments. On the contrary, it is intended to cover all alternatives, modifications and equivalents, as may be included within the spirit and scope of the invention as defined by the appended claims.

Figure 5:
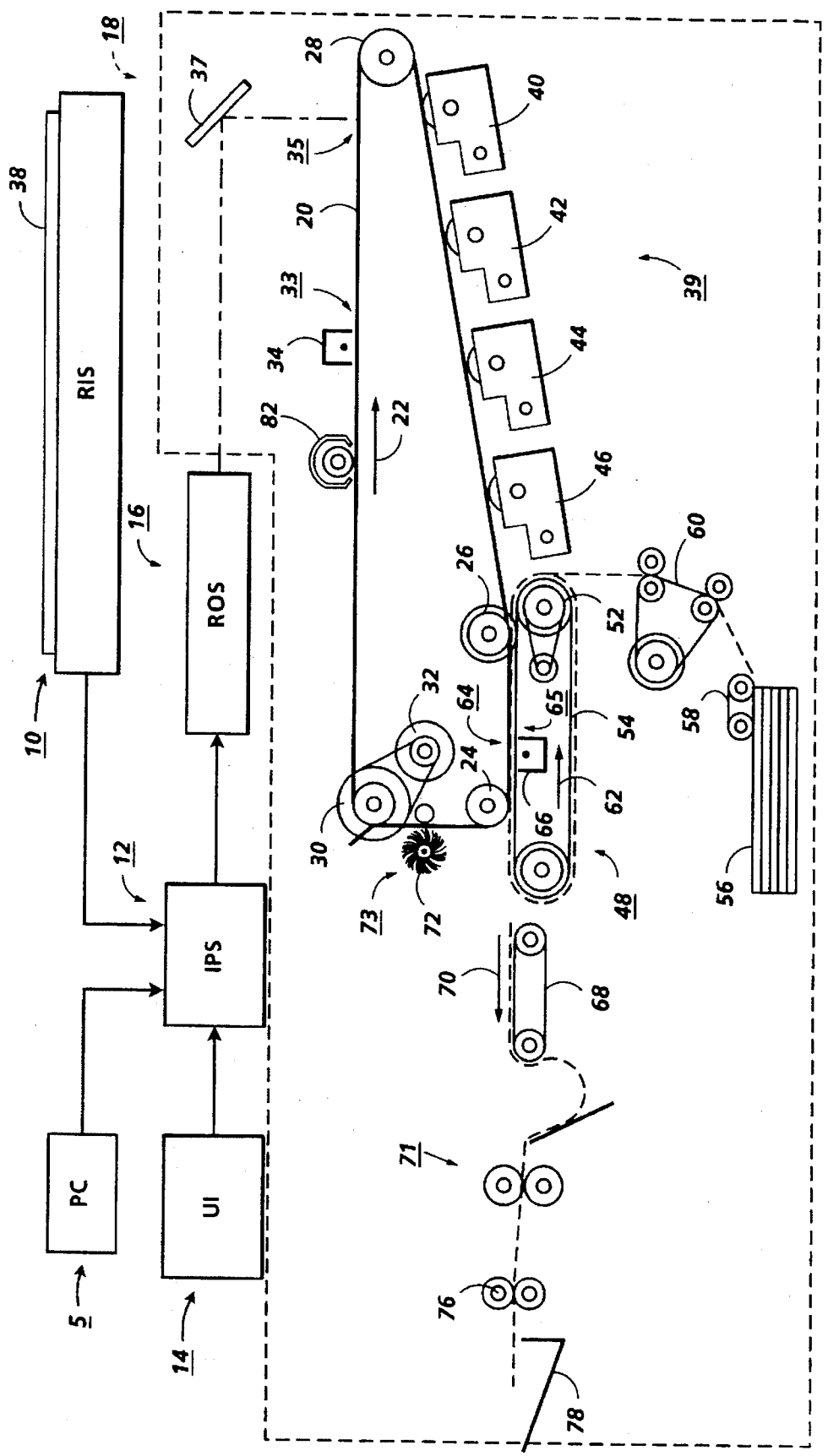
FIG. 5 is a schematic elevational view showing an exemplary color electrophotographic printing machine and networked PC incorporating features of the present invention therein.

For a general understanding of the features of the present invention, reference is made to the drawings. FIG. 5 is a schematic elevational view showing an exemplary electrophotographic printing machine and a networked PC which may incorporate features of the present invention therein. It will become evident from the following discussion that the system of the present invention is equally well suited for use in a wide variety of printing and copying systems, and therefore is not limited in application to the particular system(s) shown and described herein.

To begin by way of general explanation, FIG. 5 is a schematic elevational view showing an electrophotographic printing machine and networked PC which may incorporate features of the present invention therein. An image processing station (IPS), indicated generally by the reference numeral 12, contains data processing and control electronics which prepare and manage the image data flow to a raster output scanner (ROS), indicated generally by the reference numeral 16. A network of one or more personal computers (PC), indicated generally by the reference numeral 5, is shown interfacing/in communication with IPS 12. A user interface (UI), indicated generally by the reference numeral 14, is also in communication with IPS 12.

UI 14 enables an operator to control and monitor various operator adjustable functions and maintenance activities. The operator actuates the appropriate keys of UI 14 to adjust the parameters of the copy. UI 14 may be a touch screen, or any other suitable control panel, providing an operator interface with the system. The output signal from UI 14 is transmitted to IPS 12. UI 14 may also display electronic documents on a display screen (not shown in FIG. 5), as well as carry out the network user and printer memory utilization analysis, recommend changes regarding or automatically reconfigure printer cache and/or memory allocation to so as optimize a particular set of utilization parameters, all in accordance with the present invention as described in association with FIGS. 1 through 4 below.

As further shown in FIG. 5, a multiple color original document 38 may be positioned on (optional) raster input scanner (RIS), indicated generally by the reference numeral 10. The RIS contains document illumination lamps, optics, a mechanical scanning drive, and a charge coupled device (CCD array) or full width color scanning array. RIS 10 captures the entire image from original document 38 and converts it to a series of raster scan lines and moreover measures a set of primary color densities, i.e., red, green and blue densities, at each point of the original document. RIS 10 may provide data on the scanned image to IPS 12, indirectly to PC 5 and/or (unlike as shown in FIG. 5) directly to PC 5.

Digitized electronic documents may be created, modified, stored and/or otherwise processed by PC 5 prior to transmission/relay to IPS 12 for printing on printer 18. The display of PC 5 may show electronic documents on a screen (not shown in FIG. 5). The screen of PC 5 may also display and interface with the IPS 12 processor(s) and controller(s), to include those for use in accordance with the printer memory allocation system of the present invention as described in association with FIGS. 1 through 4 below. IPS 12 may include the processor(s) and controller(s) (not shown in FIG. 5) for performing the printer memory/cache evaluation and implementation system of the present invention.

IPS 12 also may transmits signals corresponding to the desired electronic or scanned image to ROS 16, which creates the output copy image. ROS 16 includes a laser with rotating polygon mirror blocks. Preferably, a nine facet polygon is used. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. The ROS will expose the photoconductive belt to record three or four latent images which correspond to the signals transmitted from IPS 12. One latent image is developed with cyan developer material. Another latent image is developed with magenta developer material and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 5, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three or four times to record three or four latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level, ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 52. A sheet gripper (not shown in FIG. 5) extends between belts 54 and moves in unison therewith. A sheet is advanced from a stack of sheets 56 disposed on a tray. A friction retard feeder 58 advances the uppermost sheet from stack 56 onto a pretransfer transport 60. Transport 60 advances the sheet (not shown in FIG. 5) to sheet transport 48. The sheet is advanced by transport 60 in synchronism with the movement of the sheet gripper. In this way, the leading edge of the sheet arrives at a preselected position or loading zone to be received by the open sheet gripper. The sheet gripper then closes securing the sheet thereto for movement therewith in a recirculating path. The leading edge of the sheet (again, not shown in FIG. 5) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolored copy of the colored original document. After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

Figure 1:
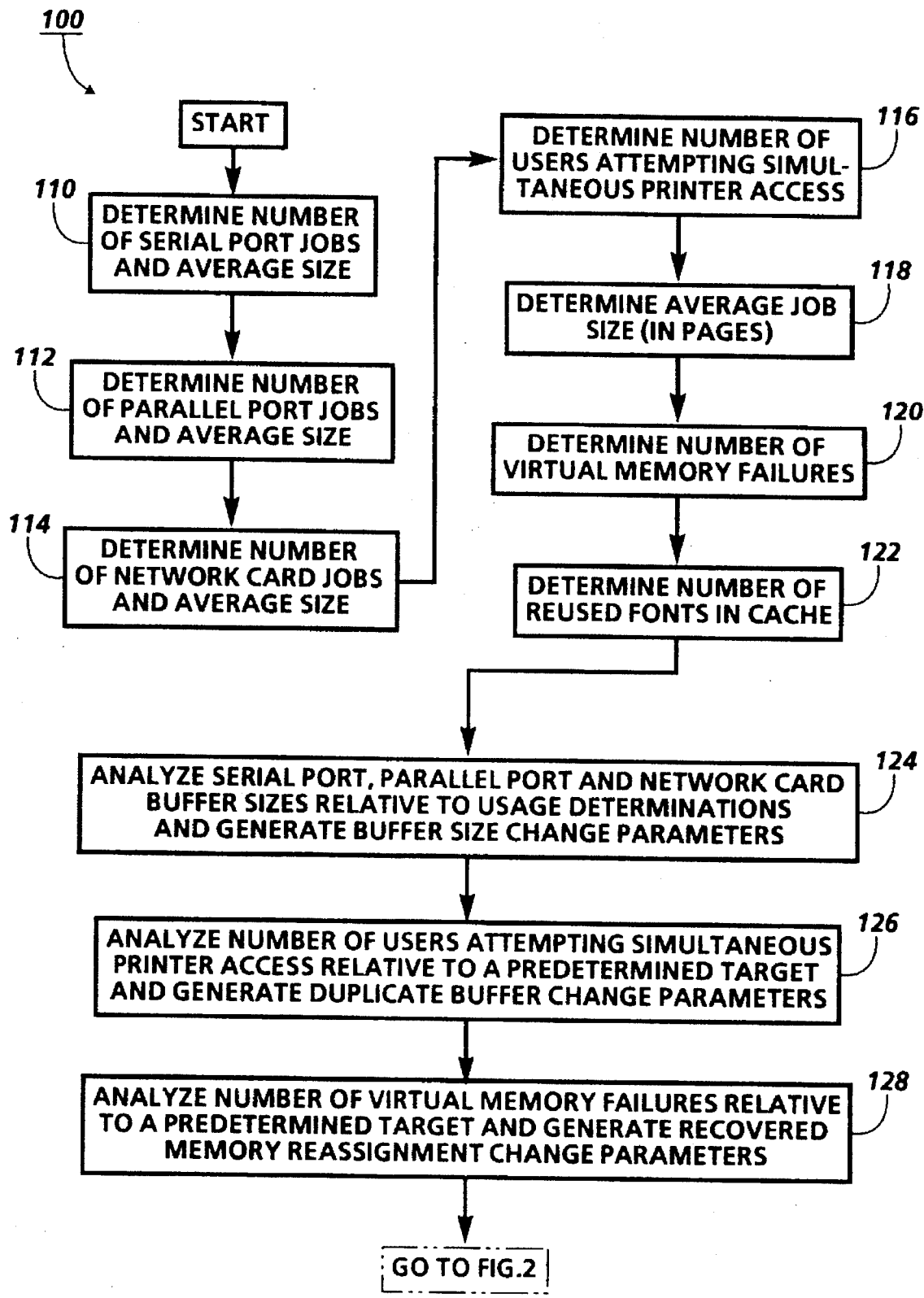
FIG. 1 is a flowchart showing a printer/network memory utilization evaluation/reallocation system of the present invention.

Turning now to FIGS. 1 through 4, FIG. 1 shows system 100 of the present invention, for determining random access memory usage and for analyzing and implementing memory allocation optimization. The usage Determinations of system 100 can be performed in any logical order. The analysis (as well as implementation and/or display processes) of system 100 (aside from processes requiring prior usage Determinations) can also be performed in any logical order. The printer itself or an external PC/controller/processor in communication with the printer (see FIGS. 4 and 5) can be used to determine, record and/or analyze as shown in FIG. 1. While one implementation of system 100 may base historical memory/printer usage data on a sample of the most recent 100 uses of the system, other sample size or selection parameters may be used as desired.

FIG. 1 shows an exemplary logical order for system 100, commencing with a determination of the number of serial port jobs and the average size of those jobs shown according to block 110. Block 112 shows a determination of the number of parallel port jobs and the average size of those jobs. Block 114 shows a determination of the number of network card jobs and the average size of those jobs. A printer spooler is typically the portion of the memory associated with the printer normally dedicated to the storage of inputted streams of data that are being received from the various input sources, such as work stations on a network. This input data is normally provided to the printer via network connection, but may also be provided according to serial or parallel ports directly on the printer. Further input sources may also be utilized in association with the present invention (such as local floppy disk inputs or other print job sources) not shown in system 100 of FIG. 1. A desirable attribute of the spooler entails enablement of the spooler to provide simultaneous spooling over all possible input sources. Increasing the size of the memory associated with the spool results in a more rapid release of the users workstation from its communication with the printer, resulting in the impression of, if not the realization of, increased speed and efficiency to the user who may thereby more quickly resume work at the work station. However, even individual printer users may use a printer in different fashions; some users may provide input to the printer from all input sources (thus, requiring associated spooling capability) while other users may use the network spool exclusively. As will later be described in association with system 100, such simultaneous spool designs can include implementation challenges, such as the difficultly of predicting how much memory should optimally be allocated to any particular input source so as to maximize printer efficiency.

With continued reference to system 100 as shown in FIG. 1, a determination of the number of users attempting to simultaneously access the printer is performed according to block 116. Block 118 shows system 100 determining the average job size in pages submitted to the printer from the various input sources. Block 120 shows the determination of the number of virtual memory failures occurring at the printer. The portion of the printer memory referred to as the "display list" holds the compressed version of the rasterized page until printing is accomplished. The larger the size of the display list memory, the more compressed pages can be stored in the display list. It can be advantageous for the printer to store multiple pages in the display list so that the printer will remain in operation over several pages without cycling down; cycling down can occur as a result of the print list being too short, in that rasterization of a page can often be a more time consuming process than printing itself. Further, if all of the pages of a document consisting of several pages can be stored in band lists, the document can be printed in collated form rather than stack form. As such, as with other forms of memory allocation occurring in the printer, it is important to allocate an adequate amount of memory to the display list in order to optimize printing efficiency.

With continued reference to system 100 shown in FIG. 1, block 122 shows the determination of the number of reused fonts in the font cash associated with the printer. Typically, in PostScript and/or PCL emulation language printers, fonts are communicated to the printer according to the outlined definitions of those fonts. Just prior to printing a file, these font outlines have to be converted to bitmaps according to a process referred to as rasterization. A printer will typically store one or more of the most recently used rasterized fonts under the assumption that there is a high likelihood that the same font or fonts will shortly or immediately be reused. This use of stored fonts enables the printer to skip the rasterization process for those saved fonts, permitting more rapid printing. Bitmapped fonts are stored in the font cache. The amount of memory allocated to the font cash can therefore have an important effect on the overall efficiency of the printer. If the font cash is too small, the printer will waste excessive time re-rasterizing the same fonts over and over. If the font cache is too large, the printer may spend excessive time looking through a memory to determine if a font has already been rasterized to the extent that it would have been quicker to re-rasterize that font in the first place. As such, the font cache management enabled by system 100 of the present invention can have an important positive effect on the efficiency of the printer.

While the spooling, font cash and display list memory allocation aspects of printing and usage Determinations related thereto have been described above so as to illustrate specific printer memory allocation considerations, this set of printer functions/memory allocation challenges that may exist is by no means exhaustive. Other such problems not detailed herein may also be dealt with according to the system of the present invention with memory; in one example, a printer that permits users to configure the various memory allocations but does not advise that user of the typical or usage based implications of memory allocation can cause additional problems when memory is less than optimally distributed amongst the various functions requiring memory in the printer.

With continued reference to system 100 of the present invention as shown in FIG. 1, again, the printer itself or an external PC/controller/processor in communication with the printer (see FIGS. 4 and 5) can be used to determine, record, analyze, display and/or implement the various system 100 random access memory use functions related to printer operations. Blocks 110, 112, 114, 116, 118, 120 and 122 of FIG. 1 have shown usage Determinations and sensing of the various historical elements of printer use relevant to user access memory allocation. A sample display 150 of these Determinations is shown in FIG. 3. Blocks 124, 126 and 128 of system 100 of FIG. 1 show the various exemplary analytical processes that occur in accordance with the present invention in analyzing these elements. Likewise, sample display 150 for these analytical processes (change recommendations and user selections) is also shown in FIG. 3. As described in association with FIGS. 4 and/or 5 below and FIG. 1 above, a processor in/associated with the printer can be used to detect how often multiple printer users attempt to communicate simultaneously with the printer (such as will require duplicate memory spools). The processor may also be used to determine how many fonts are being used, the average resident time of the font in the font cash, and the requirements for font cash memory size. Further, the processor can determine what the average length of a print job may be, so as to allocate optimal display list memory to meeting the average job length requirement.

Block 124 of system 100 in FIG. 1 shows analysis of the serial port network buffer size, parallel port buffer size and network card buffer size relative to historical usage determinations. According to the results of that analysis, an optimal size for each of these three buffers is generated. Block 126 of FIG. 1, system 100 further analyzes the number of users attempting to simultaneously access the printer relative to a predetermined target. According to decision block 130 of FIG. 2 of system 100, a user may determine whether to program the printer to automatically change memory allocations, or to display the various printer usage printer determinations and memory allocation recommendations for discrete user selection and implementation.

Figure 2:
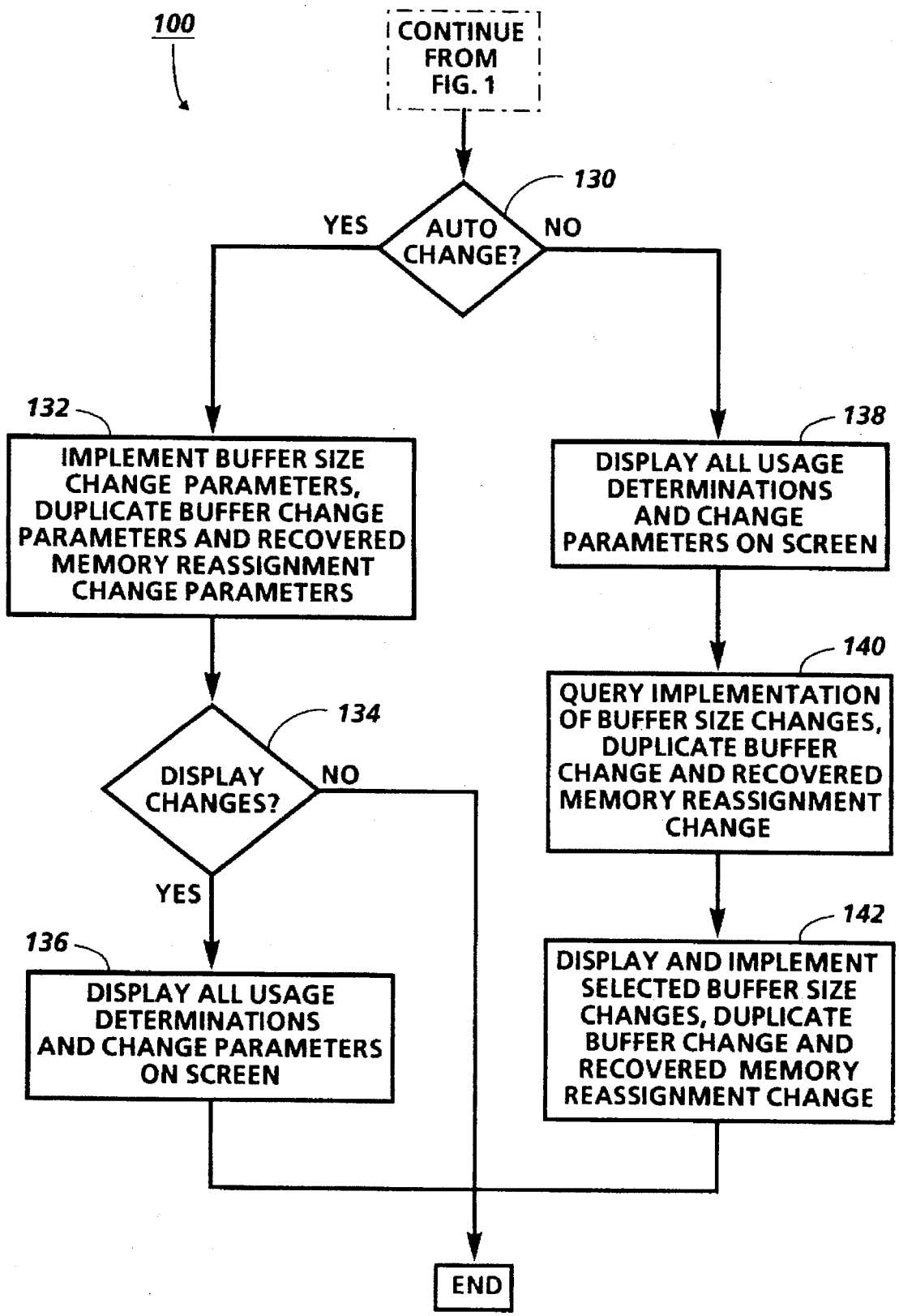
FIG. 2 is continuation of the FIG. 1 flowchart.

With continued reference to system 100 as now shown in FIG. 2, a user may determine to automatically change memory allocations according to decision block 130. Under the Auto Change selection, block 132 shows the automatic implementation of buffer size changes, duplicate buffer changes and recovered memory reassignment change parameters. Thereafter, according to decision block 134, a user may elect whether or not to display the implemented memory allocation changes and the usage determinations related to those changes on a screen or readout. Block 136 shows system 100 executing the actual display of the usage determinations and change parameters on a screen (such as shown in the exemplary display of FIG. 3 and/or the screen of FIG. 4). Thereafter, implementation under the automatic change selection option of system 100 is completed.

Figure 4:
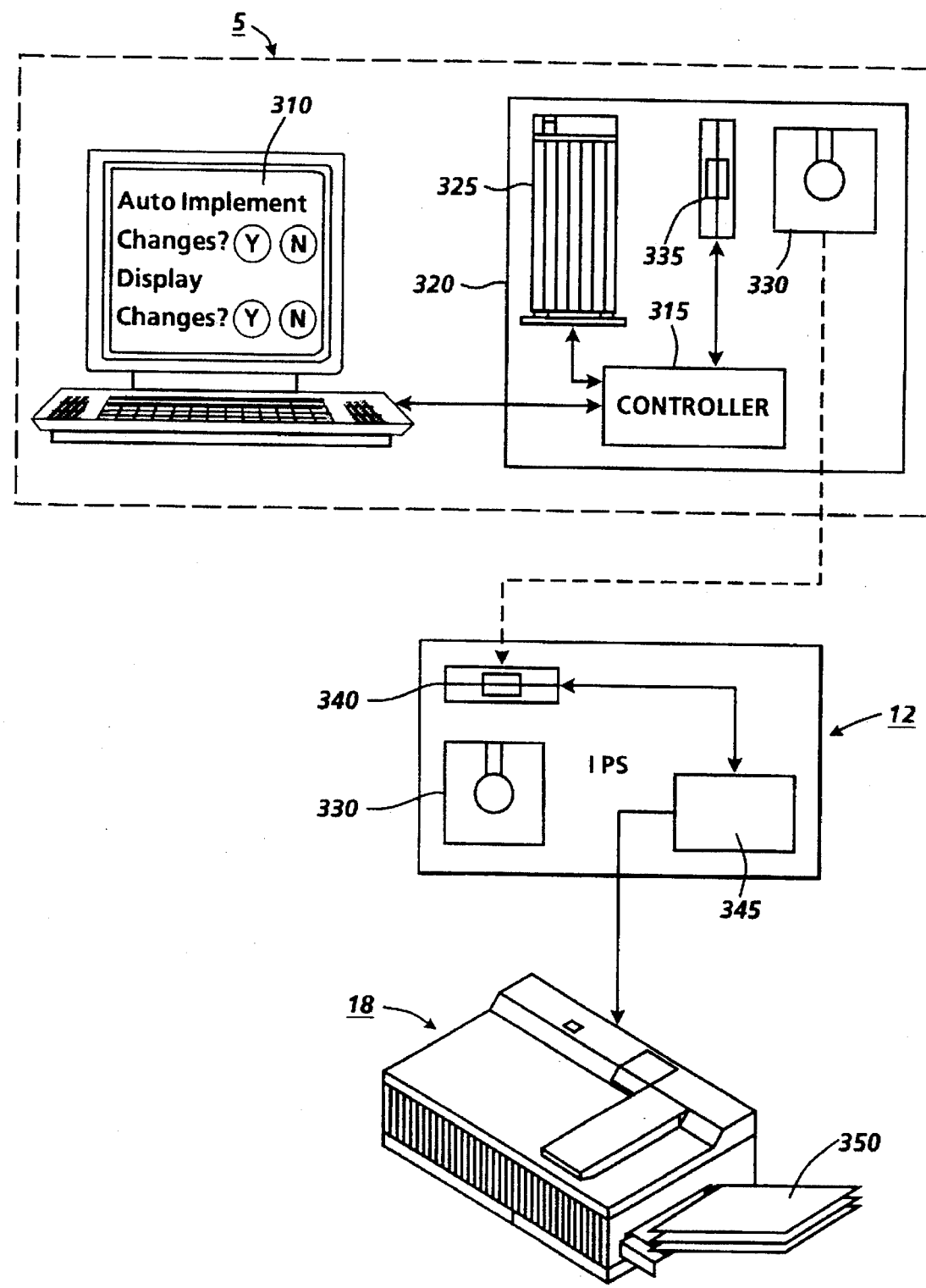
FIG. 4 is a block diagram showing further aspect, of a printer and PC system incorporating features of the present invention therein.

If at decision block 130 a user determines not to automatically change memory allocations, according to block 138, all usage determinations and change parameters will be displayed on a screen, such as shown in the representative screen display of FIG. 3 and/or the screen of FIG. 4. Thereafter, according to block 140, system 100 queries the user on the implementation of the buffer size changes, duplicate buffer change recommendation and recovered memory reassignment change. As shown in display 150 of FIG. 3, the user may according to a block 142 menu independently elect ("yes"/"no") whether or not to make the recommended buffer capacity changes as well as whether or not to eliminate the use of duplicate spooling buffers. Again, while one implementation of system 100 may base historical memory/printer usage data on a sample of the most recent 100 uses of the system (see FIG. 3), other sample size or selection parameters may be used. As shown in FIG. 3, an exemplary output of block 142 of FIG. 2 might explain that of the last 100 printed jobs, only 4 of those jobs were accessed simultaneous to the printer, allowing the user to conclude that the duplicate buffer should be eliminated. As also shown in FIG. 3, according to block 142 of FIG. 2, the user may select from the menu whether to reassign recovered memory to the "PostScript heap" for the purpose of reducing virtual memory print failures, or to the "Display list", so as to enable more rapid and efficient and continuous printing. Lastly, In each case, according to block 142 of system 100 shown in FIG. 2, the FIG. 3 selection made may be indicated by a reversible highlighting of the appropriate designation area on the display screen. Thereafter, the "no" auto change decision branch of system 100 as shown in FIG. 2 is likewise complete.

FIG. 4 shows a block schematic diagram of a PC and printer (including the IPS and print engine such as shown in FIG. 5) used to employ system 100 in conjunction with FIGS. 1, 2 and 3 as set forth above. Display screen 310 of PC 5 is shown with an abbreviated set of system 100 menu selection options, "Auto Implement?" and Display Changes? displayed thereon (such as might be shown during the block 130 "Auto Change" "yes" path shown in FIG. 2). Display screen 310 may be used to display the various operations that may be performed by the electronic system 320 of PC 5. The various printer selection menu selections available may be implemented automatically or by user (keyboard or otherwise) selection with controller 315. Diskette 330 may be used to store printer usage determinations; buffer size, duplicate buffer and recovered memory reassignment change parameter profiles; and/or printer selection/implementation schemes for uploading to or downloading from PC diskette drive 335 and/or hard drive 325 of electronic system 320. Electronic system 320 of PC 5 may perform tasks including those described in conjunction with system 100 as shown in FIGS. 1 and 2. With continued reference to FIG. 3, a user may load diskette 330 into a drive 340 included with or connected to IPS 12. Processor 345 of IPS 12 may then download to or upload from a printer usage determinations and buffer size, duplicate buffer and recovered memory reassignment change parameter profiles and/or implementation schemes.

While present invention has been described in conjunction with various embodiments, it is evident that many printer-related memory allocation uses, alternatives, modifications, and variations will be apparent to those skilled in the art. Accordingly, it is intended to embrace all such uses, alternatives, modifications, and variations as fall within the spirit and broad scope of the appended claims.

I claim:

1. An apparatus for managing a set of printer memory requirements, comprising:
   a random access memory for storing data in a set of variably sized compartments;
   a processor for determining a source of a predetermined number of print input jobs; and
   a controller, responsive to said processor, for generating a set of optimized memory compartment size allocation recommendations according to the source of the predetermined number of print input jobs.

2. The apparatus of claim 1, whereby said controller automatically implements the set of optimized memory size allocation recommendations.

3. The apparatus of claim 1, further comprising a user interface having a screen for displaying the set of optimized memory size allocation recommendations.

4. The apparatus of claim 3, wherein said user interface includes a selection means for variably implementing the set of optimized memory size allocation recommendations.

5. The apparatus of claim 1, wherein the sources of the print input jobs include network jobs, parallel port jobs and serial port jobs.

6. The apparatus of claim 1, wherein said processor further determines an average size of the predetermined number of print input jobs.

7. The apparatus of claim 1, wherein the data includes an input data stream, a bitmap and a display list.

8. The apparatus of claim 1, wherein:
   said random access memory includes a plurality of input data stream buffer locations;
   said processor detects a rate of simultaneous input data stream access attempts from each print input job source; and
   said controller, responsive to the detected simultaneous access rate detected by said processor, outputs a duplicate buffer resizing recommendation relative to a predetermined target.

9. The apparatus of claim 1, wherein:
   said random access memory includes a display list data storage location having a predetermined size;
   said processor detects a rate of print input jobs exceeding the predetermined display list storage location size; and.
   said controller, responsive to the detected print input job display list storage location size exceeding rate, outputs a display list storage location resizing recommendation relative to a predetermined target.

10. The apparatus of claim 1, wherein:
    said random access memory includes a font cache storage location having a predetermined size;
    said processor detects a number of reused fonts in the font cache; and
    said controller, responsive to the detected number of reused fonts in the font cache, outputs a font cache storage location resizing recommendation relative to a predetermined target.

11. A printing machine of the type in which a set of printer memory requirements are manage, comprising:
    a random access memory for storing data in a set of variably sized compartments;
    a processor for determining a source of a predetermined number of print input jobs; and
    a controller, responsive to said processor, for generating a set of optimized memory compartment size allocation recommendations according to the source of the predetermined number of print input jobs.

12. The printing machine of claim 11, whereby said controller automatically implements the set of optimized memory size allocation recommendations.

13. The printing machine of claim 11, further comprising a user interface having a screen for displaying the set of optimized memory size allocation recommendations.

14. The printing machines of claim 13, wherein said user interface includes a selection means for variably implementing the set of optimized memory size allocation recommendations.

15. The printing machine of claim 11, wherein the sources of the print input jobs include network jobs, parallel port jobs and serial port jobs.

16. The printing machine of claim 11, wherein said processor further determines an average size of the predetermined number of print input jobs.

17. The printing machine of claim 11, wherein the data includes an input data stream, a bitmap and a display list.

18. The printing machine of claim 11, wherein:

said random access memory includes a plurality of input data stream buffer locations;

said processor detects a rate of simultaneous input data stream access attempts from each print input job source; and said controller, responsive to the detected simultaneous access rate detected by said processor, outputs a duplicate buffer resizing recommendation relative to a predetermined target.

19. The printing machine of claim 11, wherein:

said random access memory includes a display list data storage location having a predetermined size;

said processor detects a rate of print input jobs exceeding the predetermined display list storage location size; and said controller, responsive to the detected print input job display list storage location size exceeding rate, outputs a display list storage location resizing recommendation relative to a predetermined target.

20. The printing machine of claim 11, wherein:

said random access memory includes a font cache storage location having a predetermined size;

said processor detects a number of reused fonts in the font cache; and said controller, responsive to the detected number of reused fonts in the font cache, outputs a font cache storage location resizing recommendation relative to a predetermined target.

21. A method of managing a set of printer memory requirements, comprising:

storing data in a random access memory having a set of variably sized compartments;

determining a source of a predetermined number of print input jobs; and generating a set of optimized memory compartment size allocation recommendations according to the source determinations of the predetermined number of print input jobs.

22. The method of claim 21, further comprising:

implementing the set of optimized memory size allocation recommendations.

23. The method of claim 21, further comprising:

implementing at least one of the set of optimized memory size allocation recommendations.

24. The method of claim 21, further comprising:

displaying the set of optimized memory size allocation recommendations on a user interface.

25. The method of claim 21, wherein the step of determining a source of a predetermined number of print input jobs includes selecting the source of the print input jobs from a network job source, a parallel port job source and a serial port job source.

26. The method of claim 21, further comprising:

determining an average size of the predetermined number of print input jobs.

27. The method of claim 21, wherein the step of storing data in a random access memory having a set of variably sized compartments includes storing data from an input data stream, a bitmap and a display list.

28. The method of claim 21, further comprising:

storing display list data in an input data stream buffer location in the random access memory;

detecting a rate of simultaneous input data stream access attempts from each print input job source; and outputting a duplicate buffer resizing recommendation according to the detected simultaneous input data stream access rate relative to a predetermined target.

29. The method of claim 21, further comprising:

storing display list data in an input data stream buffer location in the random access memory;

detecting a rate of simultaneous input data stream access attempts from each print input job source; and outputting a duplicate buffer resizing recommendation according to the detected simultaneous input data stream access rate relative to a predetermined target.

30. The method of claim 21, further comprising:

storing font cache data in a font cache storage location in the random access memory;

detecting a number of reused fonts in the font cache; and outputting a font cache storage location resizing recommendation according to the detected number of reused fonts in the font cache relative to a predetermined target.

* * * * *